United States Patent
Kwag (12)

(10) Patent No.: US 6,259,664 B1
(45) Date of Patent: Jul. 10, 2001

(54) DEFECT DETECTION IN AN OPTICAL DISK DATA REPRODUCTION SYSTEM

(75) Inventor: Sung-Mok Kwag, Yongin (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 09/316,595

(22) Filed: May 21, 1999

(30) Foreign Application Priority Data

Jun. 30, 1998 (KR) .................................. 98-25885

(51) Int. Cl.$^7$ ........................................ G11B 3/90

(52) U.S. Cl. ................... 369/53.15; 369/47.14; 369/124.15

(58) Field of Search .............................. 369/47.14, 47.17, 369/47.18, 53.12, 53.15, 53.16, 53.17, 53.32, 53.33, 124.01, 124.15

(56) References Cited

U.S. PATENT DOCUMENTS 5,132,956 * 7/1992 Ichikawa ........................... 369/53.17
5,485,444 * 1/1996 Kuhn et al. ....................... 369/53.15
6,084,836 * 7/2000 Kamiyama ..................... 369/53.15 X

* cited by examiner

*Primary Examiner*—Paul W. Huber
(74) *Attorney, Agent, or Firm*—Mills & Onello LLP

(57) ABSTRACT

A defect detection circuit and method for detecting disk defects in an optical disc data reproduction system allows for correct detection of defects not only during operation in a constant linear velocity mode but also during operation in a constant angular velocity mode using a channel bit clock signal as a reference signal. The circuit includes a comparator for comparing an RF signal with a first compare voltage having a predetermined voltage level and a second compare voltage having a voltage level lower than the first compare voltage, and for generating a first comparison signal activated in response to the RF signal having a level higher than that of the first compare voltage and a second comparison signal activated in response to the RF signal having a voltage level lower than that of the second compare voltage. A defect detector receives the first and the second comparison signals and a channel bit clock signal, and generates a defect detecting signal when both the first and the second comparison signals are deactivated for a period of time less than nT in duration (here, n is a positive integer and T is a period of a channel bit clock signal) and when the first or the second comparison signal is deactivated for a period of time longer than the maximum pit length+mT where m is an integer larger than 0.

26 Claims, 3 Drawing Sheets

DEFECT DETECTION IN AN OPTICAL DISK DATA REPRODUCTION SYSTEM

BACKGROUND OF THE INVENTION

1. Field of the Invention

The present invention relates to data reproduction in an optical disk system, such as a compact disc player (CDP), or a digital versatile disc (DVD) player, and more particularly, to a defect detection circuit and a method for detecting defects during data reproduction in an optical disk system. The circuit and method prevent erroneous data from being generated that would otherwise arise from a missing or irregularly generated radio frequency (RF) signal due to disc surface scratches or disk defects generated during fabrication.

2. Description of the Related Art

A defect detection circuit in an optical disk data reproduction system according to conventional technology is described as follows with reference to the attached drawings.

Figure 1:
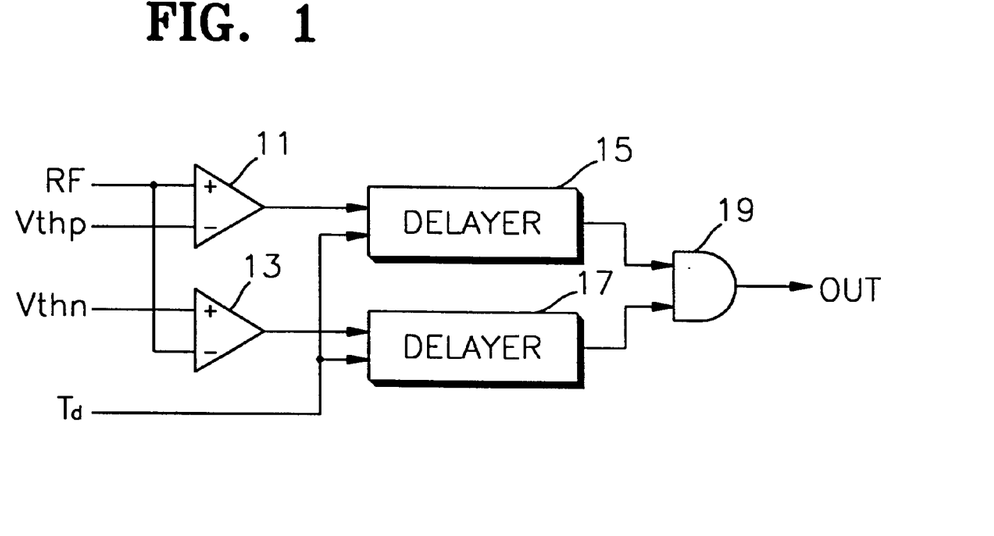
FIG. 1 is a schematic block diagram of a conventional defect detecting circuit in an optical disc data reproduction system.

FIG. 1 is a schematic block diagram of a conventional defect detection circuit in an optical disk data reproduction system, which includes first and second comparators 11 and 13, first and second delayers 15 and 17, and an AND gate 19.

FIGS. 2A through 2F are input and output waveforms of the respective elements of the circuit shown in FIG. 1. FIG. 2A shows an RF signal exhibiting a defect. FIG. 2B shows the resulting output waveform of the first comparator 11. FIG. 2C shows the resulting output waveform of the second comparator 13. FIG. 2D shows the output waveform of the first delayer 15, and FIG. 2E shows the output waveform of the second delayer 17. FIG. 2F shows the resulting output waveform of the AND gate 19.

Figure 2:
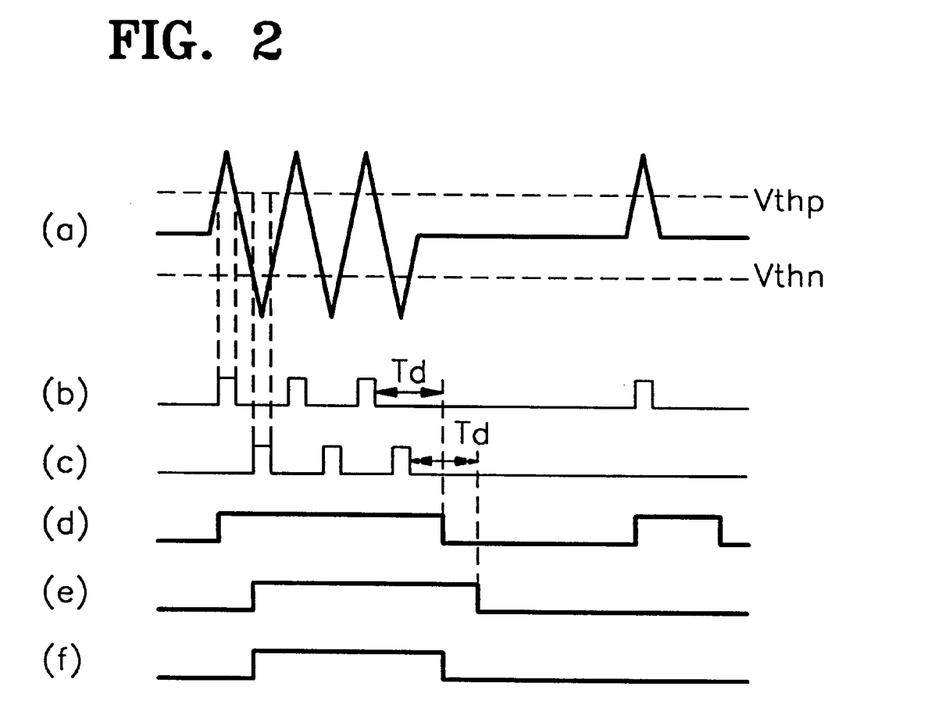
FIGS. 2A–2F are input and output waveforms of the respective elements of the apparatus of FIG. 1.

Referring to FIGS. 1 and 2, the first comparator 11 receives the RF signal of FIG. 2A via a positive input terminal, and compares it to a first compare voltage Vthp received via a negative input terminal. The first comparator 11 generates an output signal at a 'high' logic level when the voltage level of the RF signal is higher than that of the first compare voltage Vthp, and generates an output signal at a 'low' logic level when the voltage level of the RF signal is lower than that of the first compare voltage Vthp, as shown in FIG. 2B. The second comparator 13 likewise receives a second compare voltage Vthn via a positive input terminal, and compares it to the RF signal received via a negative input terminal. The second comparator 13 generates an output signal at a 'high' logic level when the voltage level of the RF signal is lower than that of the second compare voltage Vthn, and generates an output signal at a 'low' logic level when the voltage level of the RF signal is higher than the second compare voltage Vthn.

The first delayer 15 receives the output of the first comparator 11 as an input signal, and when the input signal is at a 'high' logic level, the first delayer 15 delays the input signal for a predetermined delay time Td provided by a microprocessor (not shown) to maintain the 'high' logic level during the time duration Td, such that the first delayer generates the signal shown in FIG. 2D. The second delayer 17 receives the output of the second comparator 13 as an input signal, and when the input signal is at a 'high' logic level, the second delayer 17 delays the input signal for a predetermined delay time Td, to maintain the 'high' logic level during the time duration Td such that the second delayer generates the signal shown in FIG. 2E.

As a result, the first and second delayers 15 and 17 continuously generate a signal at a 'high' logic level when the first and second comparators 11 and 13 generate a signal at a 'high' logic level within the delay time Td provided by the microprocessor (not shown), even though the outputs of the first and second comparators 11 and 13 return to a 'low' logic level, namely, when the RF signal is normally generated. However, when the 'high' logic level is not generated by the first and second comparators 11 and 13 following the delay time Td, namely, when an abnormal RF signal is generated due to defect, the first and second delayers 15 and 17 generate an output signal at a 'low' logic level indicating that there is a defect.

The AND gate 19 receives the output signals of the first and second delayers 15 and 17, performs an AND operation on the output signals, and generates the defect detection signal shown in FIG. 2F at an output terminal OUT.

The conventional defect detection circuit described above detects defects corresponding to a certain delay time Td generated by the microprocessor (not shown), regardless of a channel bit clock signal BCK commonly used as a reference signal when data recorded on the disc is reproduced. In the conventional defect detection circuit, the delay time Td with respect to the channel bit clock signal BCK, is equal for the inner and outer circumferences of the disc operating in a constant linear velocity (CLV) mode in which the same channel bit clock signal BCK is used during reproduction of data stored at the inner and outer circumferences. Accordingly, no errors are generated during reproduction.

However, a correct defect detection signal may not be generated during operation in a constant angular velocity (CAV) mode in which different channel bit clock signals BCK are used in the inner and outer circumferences of the disc. Namely, in CAV mode, since channel bit clock signals BCK having different frequencies are used for the inner and outer circumferences, a certain delay time Td is sensed differently for the inner and outer circumferences.

For example, assume the frequency of the channel bit clock signal BCK for reading data recorded in a central track of the disc to be 4.32 MHz in CAV mode. In this case, to read data recorded at the inner most circumference, a channel bit clock signal BCK of 2.16 MHz is used, which is half of 4.32 MHz. In the outer most circumference, the data is read by a channel bit clock signal BCK of 6.48 MHz, which is 1.5 times 4.32 MHz. Therefore, since the frequency of the channel bit clock signal BCK becomes larger in the outer circumference, a certain delay time Td generated in the microprocessor becomes shorter in the inner circumference, as compared to the outer circumference.

As a result, in a system operating in CAV mode, the conventional defect detecting circuit generates a certain delay time Td in the microprocessor. However, the system senses that the delay times Td having different lengths are generated during reproduction of data stored in the inner and outer circumferences of the disc. Accordingly, a correct defect detection signal is not generated.

SUMMARY OF THE INVENTION

To solve the above problems, it is an object of the present invention to provide a defect detecting circuit for an optical disc data reproduction system which correctly detects defects existing in an RF signal since delay time is controlled according to a varying channel bit clock signal in the optical disc reproducing system.

It is another object of the present invention to provide a defect detecting method performed in the defect detecting circuit of the optical disc reproducing system.

In a first aspect, the apparatus of the present invention is directed to a defect detection circuit in an optical disk data reproduction system including an optical pick up unit for generating an analog RF signal, for detecting defects in the RF signal. A comparator compares the RF signal voltage level with a first compare voltage having a predetermined voltage level and with a second compare voltage having a predetermined voltage level lower than the first compare voltage. In response to the RF signal voltage level being greater than that of the first compare voltage, a first comparison signal is generated. In response to the RF signal voltage level being less than that of the second compare voltage, a second comparison signal is generated. A defect detector receives the first and second comparison signals along with a channel bit clock signal. A defect detecting signal is generated when both the first and second comparison signals are deactivated for a time period that is greater in length than a first time duration. Alternatively, the defect detecting signal is generated when the first or the second comparison signal is deactivated for a time period that is greater in length than a second time duration.

In a preferred embodiment, the first time duration is an integer multiple of the period of the channel bit clock signal. The first time duration preferably corresponds to a predetermined minimum pit length. The second time duration preferably comprises a predetermined maximum pit length in addition to an integer multiple of the period of the channel bit clock.

In a second aspect, the present invention comprises a defect detection circuit in an optical disk data reproduction system including an optical pick up unit for generating an analog RF signal, the defect detection circuit for detecting defects in the RF signal. A comparator compares the RF signal voltage level with a first compare voltage having a predetermined voltage level and with a second compare voltage having a predetermined voltage level lower than the first compare voltage. In response to the RF signal voltage level being greater than that of the first compare voltage, a first comparison signal is generated. In response to the RF signal voltage level being less than that of the second compare voltage, a second comparison signal is generated. A first defect detector receives the first and second comparison signals and a channel bit clock signal and in response to both the first and second comparison signals being deactivated over a time period greater in length than a first time duration, a first defect detecting signal is generated. A second defect detector receives a first comparison signal and the channel bit clock signal and in response to the first comparison signal being deactivated over a time period longer than a second time duration, a second defect detecting signal is generated. A third defect detector receives the second comparison signal and the channel bit clock signal and in response to the second comparison signal being deactivated over a time period longer than the second time duration, a third defect detecting signal is generated. A first logic combining circuit performs an OR operation on the first, second, and third defect detecting signals and generate the OR operation result as the defect detecting signal.

In a preferred embodiment, the comparator comprises a first comparator for generating the first comparison signal activated in response to the RF signal having a level higher than the first compare voltage, and a second comparator for generating the second comparison signal activated in response to the RF signal having a level lower than the second compare voltage. The first defect detector preferably comprises first OR-operator for performing an OR operation on the first comparison signal and the second comparison signal and generating a third comparison signal for responding to the activation of the first comparison signal or the second comparison signal. A signal generator receives the third comparison signal and the channel bit clock signal and generates the first defect detecting signal which is activated when the third comparison signal is deactivated for a time period which is longer than the time period of a predetermined pit length.

The signal generator preferably comprises a second OR-operator for performing an OR operation on the channel bit clock signal and the first defect detecting signal. A first counter has a reset state which is deactivated in response to activation of the third comparison signal. The counter initiates counting of the output signal of the second OR-operator in response to the deactivation of the third comparison signal. The counter further generates the first defect detecting signal activated when the count value equals the first time duration. The second defect detector preferably comprises a third OR-operator for performing an OR operation on the second defect detecting signal and the channel bit clock signal. A second counter has a reset state which is deactivated in response to activation of the first comparison signal. The counter initiates counting of the output signal of the third OR operator in response to the deactivation of the first comparison signal. The counter further generates the second defect detecting signal activated when the count value equals the second time duration. The third defect detector preferably comprises a fourth OR-operator for performing an OR operation on the third defect detecting signal and the channel bit clock signal. A third counter has a reset state which is deactivated in response to activation of the second comparison signal. The counter initiates counting of the output signal of the fourth OR-operator in response to the deactivation of the second comparison signal. A third defect detecting signal is activated when the count value equals the second time duration.

The defect detecting circuit and method make it possible to correctly detect defects not only in a constant linear velocity mode but also in a constant angular velocity mode in which the frequency of the channel bit clock signals used in the inner circumference and the outer circumference of the disc are different by detecting various defects existing in the disc using the channel bit clock signal.

BRIEF DESCRIPTION OF THE DRAWINGS

The foregoing and other objects, features and advantages of the invention will be apparent from the more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF PREFERRED EMBODIMENTS

Hereinafter, the structure and the operation of a defect detecting circuit of an optical disc data reproduction system according to the present invention will be described as follows with reference to the attached drawings. For purposes of the present specification, the active state of the respective signals is assumed to be a 'high' logic level. The inactive state is assumed to be a 'low' logic level.

Figure 3:
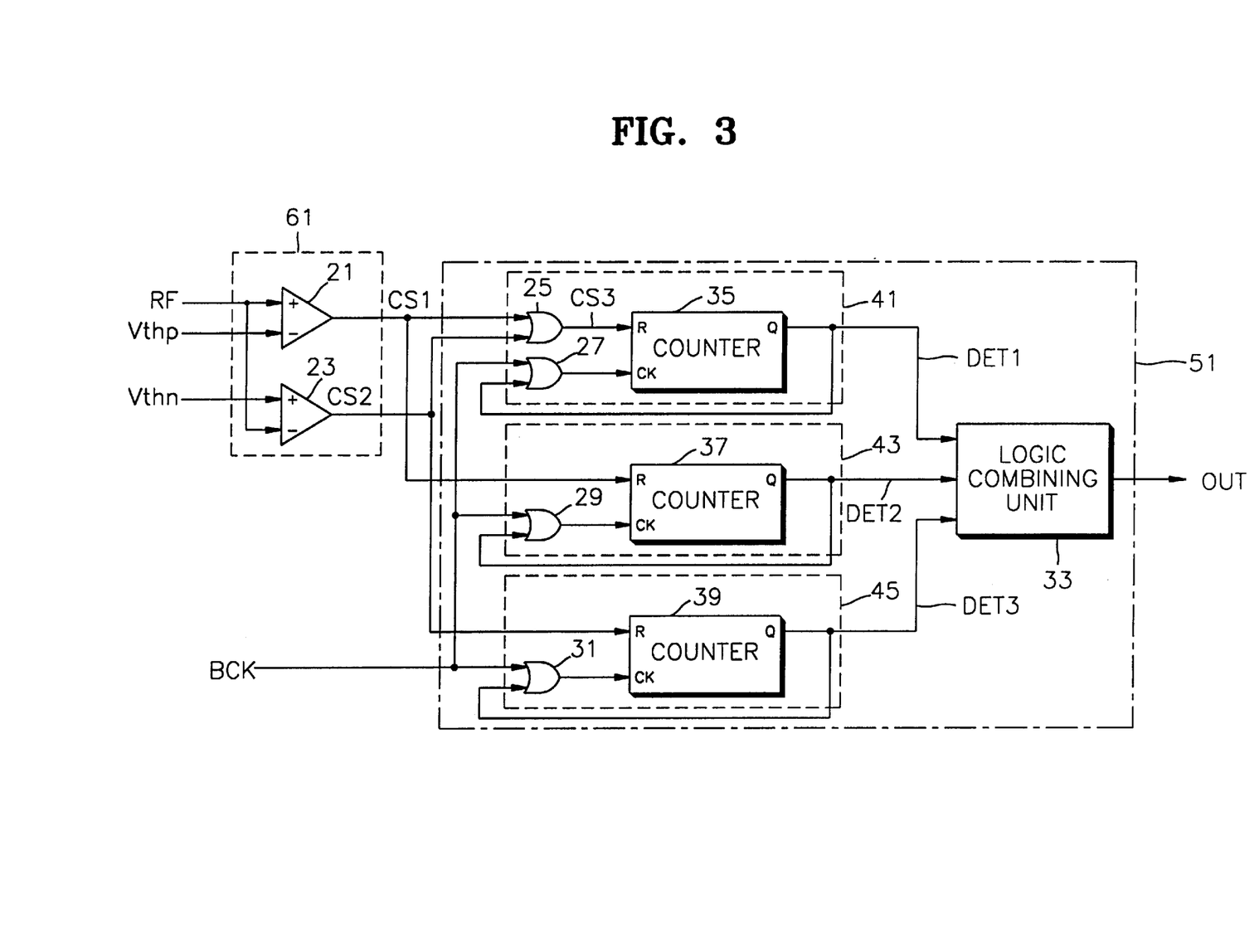
FIG. 3 is a schematic block diagram of a defect detecting circuit in an optical disc reproducing system, in accordance with the present invention.

FIG. 3 is a schematic block diagram of a defect detection circuit for an optical disc data reproduction system, in accordance with the present invention. The primary components of the defect detecting circuit include a comparator 61 and a defect detector 51.

The comparator 61 includes first and second comparators 21 and 23. The defect detector 51 includes a first defect detector 41 including a first OR gate 25, a second OR gate 27, and a first counter 35, a second defect detector 43 including a third OR gate 29 and a second counter 37, a third defect detector 45 including a fourth OR gate 31 and a third counter 39, and a logic combining unit 33.

The structure and operation of the defect detecting circuit is now described as follows with reference to FIG. 3. The first comparator 21 receives an RF signal via a positive input terminal and a first compare voltage Vthp via a negative input terminal, compares the voltage level of the RF signal with that of the first compare voltage, and outputs the comparison result to the first OR gate 25 and the reset terminal R of the second counter 37 as a first comparison signal CS1. The second comparator 23 receives a second compare voltage Vthn via a positive input terminal and the RF signal via a negative input terminal, compares the voltage level of the second compare voltage with that of the RF signal, and outputs the comparison result to the first OR gate 25 and the reset terminal R of the third counter 39 as a second comparison signal CS2.

The first OR gate 25 of the first defect detector 41 receives the first comparison signal CS1 and the second comparison signal CS2, so as to perform an OR operation, and outputs the OR operation result to the reset terminal R of the first counter 35 as a third comparison signal CS3. The second OR gate 27 performs an OR operation on a first defect detecting signal DET1 generated from the first counter 35 and the channel bit clock signal BCK used as a reference signal when the data recorded on the disc is restored and outputs the OR operation result to the clock terminal CK of the first counter 35. The first counter 35 is reset to a 'low' logic level when the third comparison signal CS3 input to the reset terminal R is at a 'high' level, and counts the output signal of the second OR gate 27 input to the clock terminal CK when the third comparison signal CS3 is at a 'low' logic level. At this time, the first counter 35 continuously outputs the first defect detecting signal at a 'low' logic level until the channel bit clock signal BCK corresponding to the minimum pit length, for example 3T (here, T is a period of a channel bit clock signal), is counted. When the first counter 35 counts the minimum pit length 3T, the first defect detecting signal DET1 is generated at a 'high' logic level, indicating that defects exist in the RF signal. This signal DET1 is provided to the logic combining unit 33 and the second OR gate 27. A signal generator can therefore be realized as the second OR gate 27 and the first counter 35.

The third OR gate 29 of the second defect detector 43 performs an OR operation on a second defect detecting signal DET2 and the channel bit clock signal BCK and outputs the OR operation result to the clock terminal CK of the second counter 37. The second counter 37 is reset to a 'low' logic level when the first comparison signal CS1 input via the reset terminal R is at a 'high' logic level, and counts the output signal of the third OR gate 29 input via the clock terminal CK when the first comparison signal CS1 is at a 'low' logic level. At this time, the second counter 37 generates the second defect detecting signal DET2 at a 'low' logic level unit1 the channel bit clock signal BCK corresponding to the maximum pit length (11T or 14T)+mT (Hereinafter, a case in which the maximum pit length is 14T, and m is 2, is taken as an example.) is counted, namely, when a value of 16T is counted. When the second counter 37 counts to a value of 16T, the second defect detecting signal is generated at a 'high' logic level, indicating that the defects exist in the RF signal. The signal DET2 is provided to the logic combining unit 33 and the third OR gate 29.

The fourth OR gate 31 of the third defect detector 45 performs an OR operation on the third defect detecting signal DET3 output from the third counter 39 and the channel bit clock signal BCK, and outputs the OR operation result to the clock terminal CK of the third counter 39. The third counter 39 is reset when the second comparison signal CS2 input via the reset terminal R is at a 'high' logic level and counts the output signal of the fourth OR gate 29 input via the clock terminal CK when the second comparison signal CS2 is at a 'low' logic level. At this time, the third counter 39 continuously generates the third defect detecting signal of a 'low' logic level until the channel bit clock signal BCK corresponding to the maximum pit length (11T or 14T)+mT (Hereinafter, a case in which the maximum pit length is 14T, and m is 2, is taken as an example.) is counted, namely, when 16T is counted. When the third counter 39 counts 16T, the third defect detecting signal is generated at a 'high' logic level, indicating that the defects exist in the RF signal. This signal DET3 is provided to the logic combining unit 33 and the fourth OR gate 31.

The logic combining unit 33 performs an OR operation on the first, second, and third defect detecting signals DET1, DET2, DET3, respectively generated by the first, second, and third defect detectors 41, 43, and 45 and outputs the OR operation result to the output terminal OUT as a final defect detection signal. The logic combining unit 33 is preferably realized by an OR gate.

FIGS. 4A through 4H are output waveform diagrams of the respective units of the circuit of FIG. 3. FIG. 4A shows an RF signal. FIG. 4B shows the first comparison signal CS1 generated by the first comparator 21. FIG. 4C shows the second comparison signal CS2 generated by the second comparator 23. FIG. 4D shows the third comparison signal CS3 generated by the first OR gate 25. FIG. 4E shows the first defect detecting signal DET1. FIG. 4F shows the second defect detecting signal DET2. FIG. 4G shows the third defect detecting signal DET3. FIG. 4H shows the defect detecting signal output from the logic combining unit 33.

FIGS. 5A through 5D arc waveform diagrams for explaining how to set the counter values of the first through third counters 35, 37, 39 shown in FIG. 3. FIG. 5A shows the RF signal. FIG. 5B shows the first comparison signal CS1 which is the output of the first comparator 21. FIG. 5C shows the second comparison signal CS2 which is the output of the second comparator 23. FIG. 5D shows the third comparison signal CS3 which is the output of the first OR gate 25.

Figure 4:
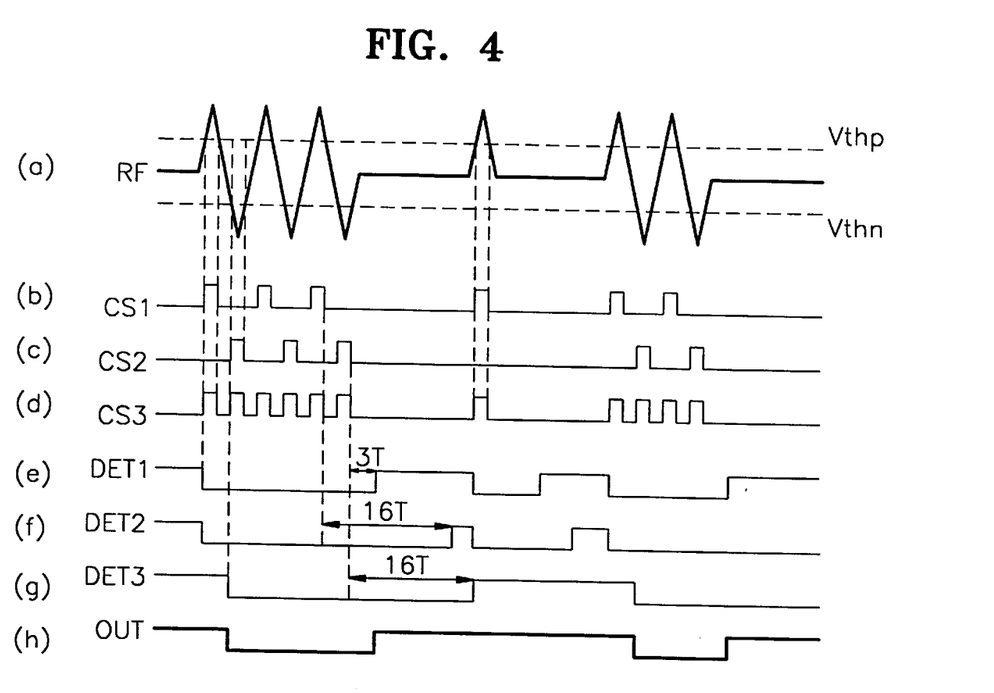
FIGS. 4A–4H are output waveform diagrams of the respective units of the circuit of FIG. 3.
Figure 5:
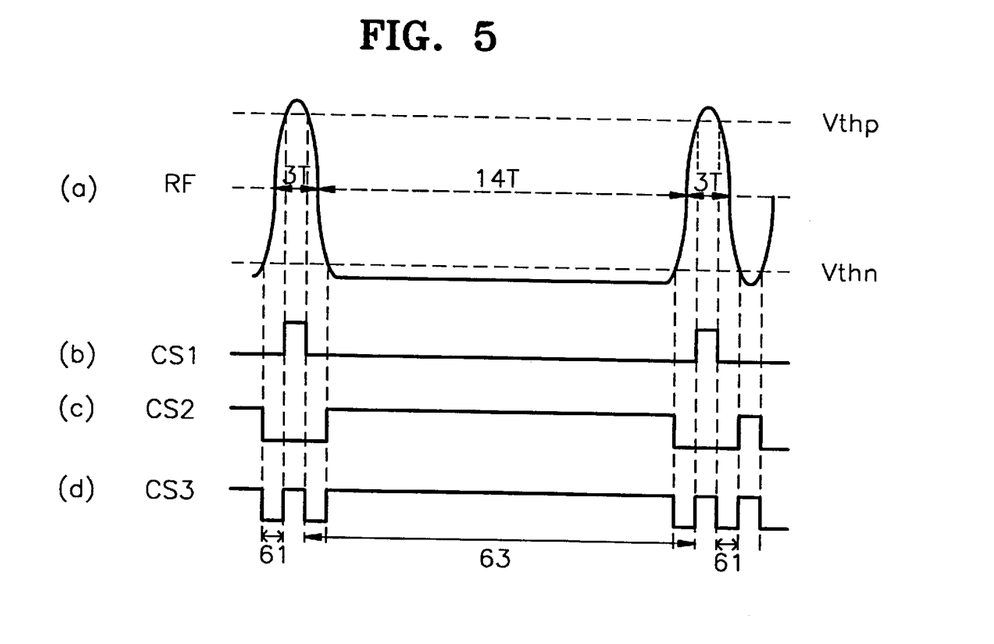
FIGS. 5A–5D are waveform diagrams for explaining how to set the counter values of the first through third counters of FIG. 3.

The operation of the defect detecting circuit of the optical disc data reproduction system according to the present invention is now described in detail with reference to FIGS. 3, 4, and 5.

The first comparator 21 receives the RF signal shown in FIG. 4A at the positive input terminal and the first compare voltage Vthp at the negative input terminal and generates the first comparison signal CS1 having a 'high' logic level during times at which the level of the RF signal is greater than that of the first comparison voltage Vthp, and a 'low' logic level during times at which the level of the RF signal is less than that of the first compare voltage Vthp as shown in FIG. 4B. The second comparator 23 receives the RF signal shown in FIG. 4A at the negative input terminal and the second compare voltage Vthn at the positive input terminal and generates the second comparison signal CS2 having a 'low' logic level during times at which the level of the RF signal is greater than that of the second compare voltage Vthn and a 'high' logic level during times at which the level of the RF signal is less than that of the second compare voltage Vthn as shown in FIG. 4C. The first OR gate 25 performs an OR operation on the first and second comparison signals CS1 and CS2 shown in FIGS. 4B and 4C and outputs the third comparison signal CS3 shown in FIG. 4D to the reset terminal R of the first counter 35.

The second OR gate 27 of the first defect detector 41 performs an OR operation on the first defect detecting signal DET1 output from the first counter 35 and the channel bit clock signal BCK, and outputs the OR-operated signal to the clock terminal CK of the first counter 35. At this time, when the third comparison signal CS3 at a 'high' logic level is input via the reset terminal R of the first counter 35, a first defect detecting signal DET1 at a 'low' logic level is generated. When the output of the third comparison signal CS3 is at a 'low' logic level, counting of the channel bit clock signal BCK input via the clock terminal CK begins. Here, since the second OR gate 27 outputs the channel bit clock signal BCK when the first counter 35 generates the defect detecting signal DET1 at a 'low' logic level, the channel bit clock signal BCK is provided via the clock terminal CK of the first counter 35.

At this time, the first counter 35 continuously outputs the first defect detection signal DET1 at a 'low' logic level when the third comparison signal CS3 at a 'high' logic level is input via the reset terminal R before the channel bit clock signal BCK is counted to a value corresponding to the minimum pit length 3T. When the first counter 35 counts the channel bit clock signal BCK to a value corresponding to the minimum pit length 3T, when the third comparison signal CS3 at a 'high' logic level is not provided, the first counter 35 generates the first defect detecting signal DET1 of a 'high' logic level, indicating that a defect exists in the RF signal, as shown in FIG. 4E.

The reason for setting the first defect detecting signal at a 'high' logic level when the first counter 35 counts to a value of 3T is now described with reference to FIG. 5. Referring to FIG. 5, in the case of a normal RF signal shown in FIG. 5A, the time taken for the RF signal to fall from the level of the first compare voltage Vthp to the second compare voltage Vthn, or the time taken for the RF signal to rise from the level of the second compare voltage Vthn to the first compare voltage Vthp is smaller than 3T. Namely, the 'low' logic level section 61 of the third comparison signal CS3 shown in FIG. 5D is smaller than 3T, which is the minimum pit length. Therefore, when the third comparison signal CS3 falls to the 'low' logic level and does not rise to the 'high' logic level after the lapse of 3T, this means that a defect exists in the RF signal. Therefore, the first defect detecting signal DET1 at 'high' logic level is generated.

The second counter 37 of the second defect detector 43 receives the first comparison signal CS1 via the reset terminal R, is reset when the first comparison signal CS1 is at a 'high' logic level, and outputs the second defect detecting signal DET2 at a 'low' logic level. When the first comparison signal CS1 transitions to 'low' logic level, the second counter 37 is not in a reset state and begins to count the channel bit clock signal provided from the third OR gate 29 to the clock terminal CK. At this time, the third OR gate 29 outputs the channel bit clock BCK when counter 37 generates the defect detecting signal DET2 at a 'low' logic level.

When a first comparison signal CS1 at a 'high' logic level is provided before the second counter 37 counts a channel bit clock signal corresponding to a time period of 16T, the second counter 37 continuously outputs the second defect detecting signal DET2 at a 'low' logic level. When a first comparison signal CS1 at a 'high' logic level is not provided, when the second counter 37 counts the channel bit clock signal to a value corresponding to 16T, the second counter 37 generates a second defect detecting signal DET2 at a 'high' logic level, indicating that a defect exists in the RF signal, as shown in FIG. 4F.

The reason why the second defect detecting signal DET2 is generated at a 'high' logic level when the second counter 37 counts to a value corresponding to 16T is described with reference to FIG. 5. As shown in FIG. 5A, when the RF signal having the maximum pit length 14T is generated, the first comparison signal CS1 transitions to a 'low' logic level during section 63 for a longer time period than 14T (14T+ mT) as shown in FIG. 5B. The length of the section 63 is defined as 16T(m=2), which can be defined as a predetermined value due to system characteristics. It is therefore determined that a normal RF signal is generated, as the first comparison signal CS1 at a 'high' logic level is not generated before the second counter 37 counts to a value of 16T. Accordingly, a second defect detecting signal DET2 at a 'low' logic level is generated. However, when the first comparison signal CS1 at a 'high' logic level is not generated after counting to a value of 16T, this means that a defect exists in the RF signal. Therefore a second defect detecting signal DET2 at 'high' logic level is generated.

The third counter 39 of the third defect detector 45 receives the second comparison signal CS2 via the reset terminal R, is reset when the second comparison signal CS2 is at a 'high' logic level, and upon being reset, outputs a signal at a 'low' logic level. When the second comparison signal CS2 is at a 'low' logic level, the third counter 39 is not in a reset state and begins to count the channel bit clock signal provided by the fourth OR gate 31 to the clock terminal CK (here, the fourth OR gate 31 outputs the channel bit clock signal BCK when the third counter 39 generates the reset signal).

At this time, when the second comparison signal CS2 at a 'high' logic level is provided before the third counter 39 counts to a value corresponding to 16T, the third counter 39 outputs a third defect detecting signal DET3 at a 'low' logic level. When the third counter 39 counts to a value corresponding to 16T when the second comparison signal CS2 at a 'high' logic level is not provided, the third counter 39 generates the third defect detecting signal DET3 at a 'high' logic level indicating that a defect exists in the RF signal. Here, the reason why the third defect detecting signal DET3 is generated at a 'high' logic level when the third counter 39 counts to a value corresponding to 16T is similar to the reason described above with respect to the second defect detector 43.

The logic combining unit 33 in the form of a fifth OR gate receives the first, second, and third defect detecting signals DET1, DET2, and DET3 shown respectively in FIGS. 4E through 4F, performs an OR operation on the first, second, and third defect detecting signals, and outputs the OR operation result to the output terminal OUT as a final defect detecting signal. Namely, the defect detecting signal shown in FIG. 4H is generated for the above example having a 'low' logic level during a time period in which the normal RF signal is generated and having a 'high' logic level during a time period in which the normal RF signal is not generated due to the defect.

The defect detecting circuit of the optical disc data reproduction system according to the present invention detects first, second, and third defect detecting signals using the channel bit clock signal BCK. In this manner, it is possible to correctly detect the defect by counting the channel bit clock signal BCK of 3T and 16T, not only for the case of constant linear velocity in which the channel bit clock signals BCK used in the inner circumference and the outer circumference of the disc are the same, but also in the case of constant angular velocity in which the channel bit clock signals BCK used in the inner circumference and the outer circumference of the disc are different.

While this invention has been particularly shown and described with references to preferred embodiments thereof, it will be understood by those skilled in the art that various changes in form and details may be made therein without departing from the spirit and scope of the invention as defined by the appended claims.

What is claimed is:

1. A defect detection circuit in an optical disc data reproduction system including an optical pick up unit for generating an analog RF signal, the defect detection circuit for detecting defects in the RF signal comprising:

a comparator for comparing the RF signal voltage level with a first compare voltage having a predetermined voltage level and with a second compare voltage having a predetermined voltage level lower than the first compare voltage, and in response to the RF signal voltage level being greater than that of the first compare voltage generating a first comparison signal, and in response to the RF signal voltage level being less than that of the second compare voltage generating a second comparison signal; and a defect detector for receiving the first and second comparison signals and a channel bit clock signal, and for generating a defect detecting signal when both the first and second comparison signals are deactivated for a time period that is greater in length than a first time duration and when the first or the second comparison signal is deactivated for a time period that is greater in length than a second time duration.

2. The defect detection circuit of claim 1 wherein the first time duration is an integer multiple of the period of the channel bit clock signal.

3. The defect detection circuit of claim 2 wherein the first time duration corresponds to a predetermined minimum pit length.

4. The defect detection circuit of claim 1 wherein the second time duration comprises a predetermined maximum pit length in addition to an integer multiple of the period of the channel bit clock.

5. A defect detection circuit in an optical disc data reproduction system including an optical pick up unit for generating an analog RF signal, the defect detection circuit for detecting defects in the RF signal, comprising:

a comparator for comparing the RF signal voltage level with a first compare voltage having a predetermined voltage level and with a second compare voltage having a predetermined voltage level lower than the first compare voltage, and in response to the RF signal voltage level being greater than that of the first compare voltage generating a first comparison signal, and in response to the RF signal voltage level being less than that of the second compare voltage generating a second comparison signal;

a first defect detector for receiving the first and second comparison signals and a channel bit clock signal, and for generating a first defect detecting signal in response to both the first and the second comparison signals being deactivated over a time period greater in length than a first time duration;

a second defect detector for receiving the first comparison signal and the channel bit clock signal and generating a second defect detecting signal in response to the first comparison signal being deactivated over a time period longer than a second time duration;

a third defect detector for receiving the second comparison signal and the channel bit clock signal and generating a third defect detecting signal in response to the second comparison signal being deactivated over a time period longer than the second time duration; and a first logic combining circuit for performing an OR-operation on the first, second, and third defect detecting signals and generating the OR-operation result as the defect detecting signal.

6. The defect detection circuit of claim 5, wherein the comparator comprises:

a first comparator for generating the first compare signal activated in response to the RF signal having a level higher than the first compare voltage; and a second comparator for generating the second comparison signal activated in response to the RF signal having a level lower than the second compare voltage.

7. The defect detection circuit of claim 5, wherein the first defect detector comprises:

a first OR operator for performing an OR operation on the first comparison signal and the second comparison signal, and generating a third comparison signal for responding to the activation of the first comparison signal or the second comparison signal; and a signal generator for receiving the third comparison signal and the channel bit clock signal, and generating the first defect detecting signal activated when the third comparison signal is deactivated for a time period which is longer than the time period of a predetermined pit length.

8. The defect detection circuit of claim 7, wherein the signal generator comprises:

a second OR operator for performing an OR-operation on the channel bit clock signal and the first defect detecting signal; and a first counter having a reset state which is deactivated in response to activation of the third comparison signal, said counter initiating counting of the output signal of the second OR operator in response to the deactivation of the third comparison signal, and generating the first defect detecting signal activated when the count value equals the first time duration.

9. The defect detection circuit of claim 5, wherein the second defect detector comprises:

a third OR operator for performing an OR operation on the second defect detecting signal and the channel bit clock signal; and a second counter having a reset state which is deactivated in response to activation of the first comparison signal, said counter initiating counting of the output signal of the third OR operator in response to the deactivation of the first comparison signal, and generating the second defect detecting signal activated when the count value equals the second time duration.

10. The defect detection circuit of claim 5, wherein the third defect detector comprises:

a fourth OR operator for performing an OR operation on the third defect detecting signal and the channel bit clock signal; and a third counter having a reset state which is deactivated in response to activation of the second comparison signal, said counter initiating counting of the output signal of the fourth OR operator in response to the deactivation of the second comparison signal, and generating the third defect detecting signal activated when the count value equals the second time duration.

11. The defect detection circuit of claim 5 wherein the first time duration is an integer multiple of the period of the channel bit clock signal.

12. The defect detection circuit of claim 11 wherein the first time duration corresponds to a predetermined minimum pit length.

13. The defect detection circuit of claim 5 wherein the second time duration comprises a predetermined maximum pit length in addition to an integer multiple of the period of the channel bit clock.

14. A method of defect detection in an optical disc data reproduction system including an optical pick up unit for generating an analog RF signal, the method for detecting defects in the RF signal comprising:

comparing the RF signal voltage level with a first compare voltage having a predetermined voltage level and with a second compare voltage having a predetermined voltage level lower than the first compare voltage, and in response to the RF signal voltage level being greater than that of the first compare voltage generating a first comparison signal, and in response to the RF signal voltage level being less than that of the second compare voltage generating a second comparison signal; and receiving the first and second comparison signals and a channel bit clock signal at defect detector, and in response generating a defect detecting signal when both the first and second comparison signals are deactivated for a time period that is greater in length than a first time duration and when the first or the second comparison signal is deactivated for a time period that is greater in length than a second time duration.

15. The method of defect detection of claim 14 wherein the first time duration is an integer multiple of the period of the channel bit clock signal.

16. The method of defect detection of claim 15 wherein the first time duration corresponds to a predetermined minimum pit length.

17. The method of defect detection of claim 14 wherein the second time duration comprises a predetermined maximum pit length in addition to an integer multiple of the period of the channel bit clock.

18. A method of defect detection in an optical disc data reproduction system including an optical pick up unit for generating an analog RF signal, the defect detection method for detecting defects in the RF signal, comprising:

comparing the RF signal voltage level with a first compare voltage having a predetermined voltage level and with a second compare voltage having a predetermined voltage level lower than the first compare voltage, and in response to the RF signal voltage level being greater than that of the first compare voltage generating a first comparison signal, and in response to the RF signal voltage level being less than that of the second compare voltage generating a second comparison signal;

receiving the first and second comparison signals and a channel bit clock signal at a first defect detector, and generating a first defect detecting signal in response to both the first and the second comparison signals being deactivated over a time period greater in length than a first time duration;

receiving the first comparison signal and the channel bit clock signal at second defect detector and generating a second defect detecting signal in response to the first comparison signal being deactivated over a time period longer than a second time duration;

receiving the second comparison signal and the channel bit clock signal at third defect detector and generating a third defect detecting signal in response to the second comparison signal being deactivated over a time period longer than the second time duration; and performing an OR-operation on the first, second, and third defect detecting signals and generating the OR-operation result as the defect detecting signal.

19. The method of defect detection of claim 18, wherein comparing comprises:

generating the first comparison signal activated in response to the RF signal having a level higher than the first comparison voltage, at a first comparator; and generating the second comparison signal activated in response to the RF signal having a level lower than the second comparison voltage, at a second comparator.

20. The method of defect detection of claim 18, wherein the first defect detector comprises:

a first OR operator for performing an OR operation on the first comparison signal and the second comparison signal, and generating a third comparison signal for responding to the activation of the first comparison signal or the second comparison signal; and a signal generator for receiving the third comparison signal and the channel bit clock signal, and generating the first defect detecting signal activated when the third comparison signal is deactivated for a time period which is longer than the time period of a predetermined pit length.

21. The method of defect detection of claim 20, wherein the signal generator comprises:

a second OR operator for performing an OR-operation on the channel bit clock signal and the first defect detecting signal; and a first counter having a reset state which is deactivated in response to activation of the third comparison signal, said counter initiating counting of the output signal of the second OR operator in response to the deactivation of the third comparison signal, and generating the first defect detecting signal activated when the count value equals the first time duration.

22. The method of defect detection of claim 18, wherein the second defect detector comprises:

a third OR operator for performing an OR operation on the second defect detecting signal and the channel bit clock signal; and a second counter having a reset state which is deactivated in response to activation of the first comparison signal, said counter initiating counting of the output signal of the third OR operator in response to the deactivation of the first comparison signal, and generating the second defect detecting signal activated when the count value equals the second time duration.

23. The method of defect detection of claim 18, wherein the third defect detector comprises:

fourth OR operator for performing an OR operation on the third defect detecting signal and the channel bit clock signal; and a third counter having a reset state which is deactivated in response to activation of the second comparison signal, said counter initiating counting of the output signal of the fourth OR operator in response to the deactivation of the second comparison signal, and generating the third defect detecting signal activated when the count value equals the second time duration.

24. The method of defect detection of claim 18 wherein the first time duration is an integer multiple of the period of the channel bit clock signal.

25. The method of defect detection of claim 24 wherein the first time duration corresponds to a predetermined minimum pit length.

26. The method of defect detection of claim 18 wherein the second time duration comprises a predetermined maximum pit length in addition to an integer multiple of the period of the channel bit clock.

* * * * *